(12) United States Patent
Dow et al.

(10) Patent No.: US 6,431,165 B1
(45) Date of Patent: Aug. 13, 2002

(54) METHOD AND APPARATUS FOR CLEANING A BARBECUE GRILL

(76) Inventors: Clifford F. Dow, 9466 N. 106th Pl., Scottsdale, AZ (US) 85258; Roy J. Dunlop, 101 Shawn Ave., Nutterfort, WV (US) 26301

( * ) Notice: Subject to any disclaimer, the term of this patent is extended or adjusted under 35 U.S.C. 154(b) by 0 days.

(21) Appl. No.: 09/874,668

(22) Filed: Jun. 5, 2001

(51) Int. Cl.[7] .............................. A47J 37/00; F24B 3/00
(52) U.S. Cl. ................................ 126/25 R; 126/41 R
(58) Field of Search .......................... 126/25 R, 41 R, 126/9 R, 211; 99/450, 400, 446, 426; 134/19, 20; 219/405, 450.1

(56) References Cited

U.S. PATENT DOCUMENTS

| | | | |
|---|---|---|---|
| 3,800,777 A | | 4/1974 | Gebien |
| 4,240,398 A | * | 12/1980 | Lindop ................... 126/25 R |
| 5,088,069 A | * | 2/1992 | Koziol ................... 126/25 R |
| 5,605,143 A | * | 2/1997 | Hebert ................... 126/41 R |
| 5,645,042 A | | 7/1997 | Tompkins, Jr. |
| 5,996,572 A | * | 12/1999 | Ilagan ................... 126/25 R |
| 6,104,004 A | * | 8/2000 | Ragland et al. ............ 219/405 |

* cited by examiner

Primary Examiner—James C. Yeung
(74) Attorney, Agent, or Firm—Dority & Manning, PA

(57) ABSTRACT

A heat-resistant, flat sheet with a reflective surface is used to remove food residues from a barbecue grill after cooking. The flat sheet reflects and concentrates heat in the grill to oxidize the food residues quickly and efficiently. Remaining ash is easily brushed off of the grill and no residues remain to contaminate food to be cooked. The advantage is a faster, more thorough cleaning with significantly reduced energy consumption.

20 Claims, 2 Drawing Sheets

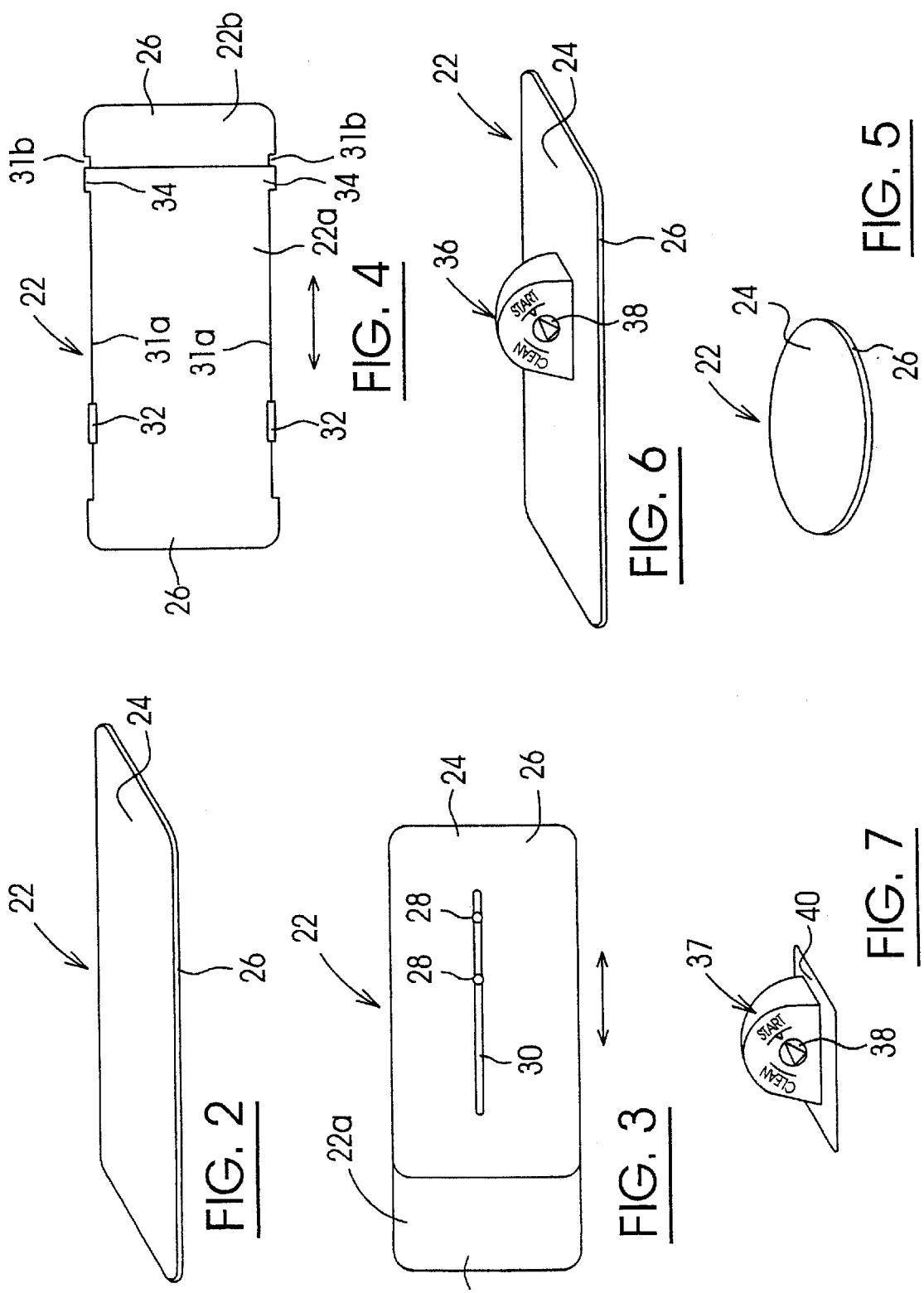

METHOD AND APPARATUS FOR CLEANING A BARBECUE GRILL

CROSS-REFERENCE TO RELATED APPLICATIONS

This is the first application filed for the present invention.

MICROFICHE APPENDIX

Not Applicable.

FIELD OF THE INVENTION

The invention relates generally to the cleaning and maintenance of barbecue grills and, in particular, to a method and apparatus for removing cooking residue from the surfaces of a barbecue grill.

BACKGROUND OF THE INVENTION

The preparation of food over an open flame is one of the oldest known methods of food preparation and remains popular today. Barbecues are commonly used for this purpose. Barbecues include a heat source, which is typically charcoal or propane gas. Food is supported over the heat source by a grill that is commonly rectangular or circular in shape. During cooking, food is supported by the grill over the heat source. Due to the heat of the grill, food residues collect on the grill surface during the cooking process. It is well known that such residues are undesirable and may represent a health hazard if proper cleaning procedures are not followed.

Consequently, many brushes and scrapers have been designed to remove food residue from a grill surface. The problem with a brush or scraper is that not all food residues are removed by the process. An alternate method for removing food residues from a barbecue grill is to permit the fuel source to continue to burn for a sufficient length of time to completely oxidize the food residues on the grill surface. This method works well for gas-fired barbecues where fuel control permits the barbecue to be fired for as long as required after cooking has been completed. For charcoal-fired barbecues, however, fuel control is less precise, and adequate fuel may not remain to permit the food residues to be completely oxidized.

A further problem with this method is the amount of fuel required to burn off food residues from a barbecue grill. U.S. Pat. No. 5,645,042 which issued on Jul. 8, 1997 to Tompkins, Jr. describes a gas grill afterburner in which an auxiliary fuel tank is charged during the cooking process with adequate fuel to permit the food residues to be burned off the grill after the cooking process is completed and the main fuel valve has been closed. Tompkins, Jr. teaches that a 5–10 pound capacity cylinder, which typically yields a required 15–20 minutes of burn-off time, is required to ensure complete oxidation of food stuffs on the grill. Consequently, a considerable amount of fuel is required to completely oxidize food residue on a barbecue grill in this way. This method is therefore energy-inefficient.

There therefore remains a need for a method and apparatus for cleaning food residue from a barbecue grill that is quicker and more energy-efficient than methods known in the prior art.

SUMMARY OF THE INVENTION

It is therefore an object of the invention to provide a method and apparatus for cleaning food residue from barbecue grills which are more energy-efficient than prior art processes.

The invention therefore provides an apparatus for cleaning a barbecue grill comprising a heat-resistant, flat sheet with a reflective surface, the flat sheet being dimensioned to substantially cover the barbecue grill while permitting a cover of the barbecue grill to be closed. The flat sheet is preferably a metal sheet and may be, for example, a galvanized steel, stainless steel or aluminum sheet that is polished on one side. After cooking is complete, the heat-resistant sheet is placed on the barbecue grill with the polished side facing downwards and the cooking flame is left at cooking temperature for a period of time required to completely oxidize food residue from the grill surface. Normally, oxidization is complete after a maximum of about 10 minutes. Oxidization commences almost immediately, and completion of the oxidation process is readily gauged by observing the smoke that is emitted from the barbecue. When oxidation is complete, no smoke is emitted.

When oxidation is complete, the fuel source can be extinguished if a gas or electric barbecue is used. If a charcoal barbecue is used, the fuel source is permitted to burn out. The heat-resistant, flat sheet can be removed from the barbecue any time after oxidation is complete, though it is convenient to leave the flat sheet in the barbecue until the next cooking session. The flat sheet is removed and ash is brushed off the grill prior to igniting the barbecue for the next cooking session.

The heat-resistant, flat sheet may be provided with an alert mechanism to remind the barbecue user to extinguish the heat source if a gas or electric barbecue is used. The alert mechanism may be heat or time activated and emits an audible reminder tone when activated. The alert mechanism may be connected directly to a top surface of the heat-resistant sheet and may be an independent unit that is conveniently positioned outside the barbecue.

The invention further provides a method of cleaning a barbecue grill after cooking food on the grill. The method comprises steps of placing a heat-resistant, flat sheet with a reflective surface on the grill after cooked food has been removed, with the reflective surface oriented toward the heat source. The flat sheet is placed on the grill without extinguishing the heat source. If the grill has a cover, the cover is closed. The heat source is extinguished after smoke stops issuing from the barbecue, unless the heat source is a self-extinguishing carbonaceous fuel.

Preferably, the barbecue is permitted to cool to ambient temperature before removing the heat-resistant, flat sheet. After the flat sheet is removed, ash is brushed from the barbecue grill. Conveniently, the flat sheet is left on the barbecue until the next cooking session. If so, the flat sheet is removed and ash is brushed from the grill prior to igniting the grill for the next cooking session.

BRIEF DESCRIPTION OF THE DRAWINGS

Further features and advantages of the present invention will become apparent from the following detailed description, taken in combination with the appended drawings, in which:

FIG. 2 is a perspective view of the heat-resistant, flat sheet shown in FIG. 1;

FIG. 3 is an alternate embodiment of the heat-resistant, flat sheet designed to permit the flat sheet to be adjusted in length to accommodate different-sized barbecue grills;

FIG. 4 is an alternate embodiment of the adjustable heat-resistant, flat sheet shown in FIG. 3;

FIG. 5 is a circular version of the heat-resistant, flat sheet designed for use with circular grills;

FIG. 6 is a perspective view of the heat-resistant, flat sheet shown in FIG. 2 with an alert mechanism mounted to a top surface thereof; and FIG. 7 is a perspective view of an alert mechanism provided independently of the heat-resistant, flat sheet shown in FIG. 2.

It will be noted that throughout the appended drawings, like features are identified by like reference numerals.

DETAILED DESCRIPTION OF THE PREFERRED EMBODIMENT

Figure 1:
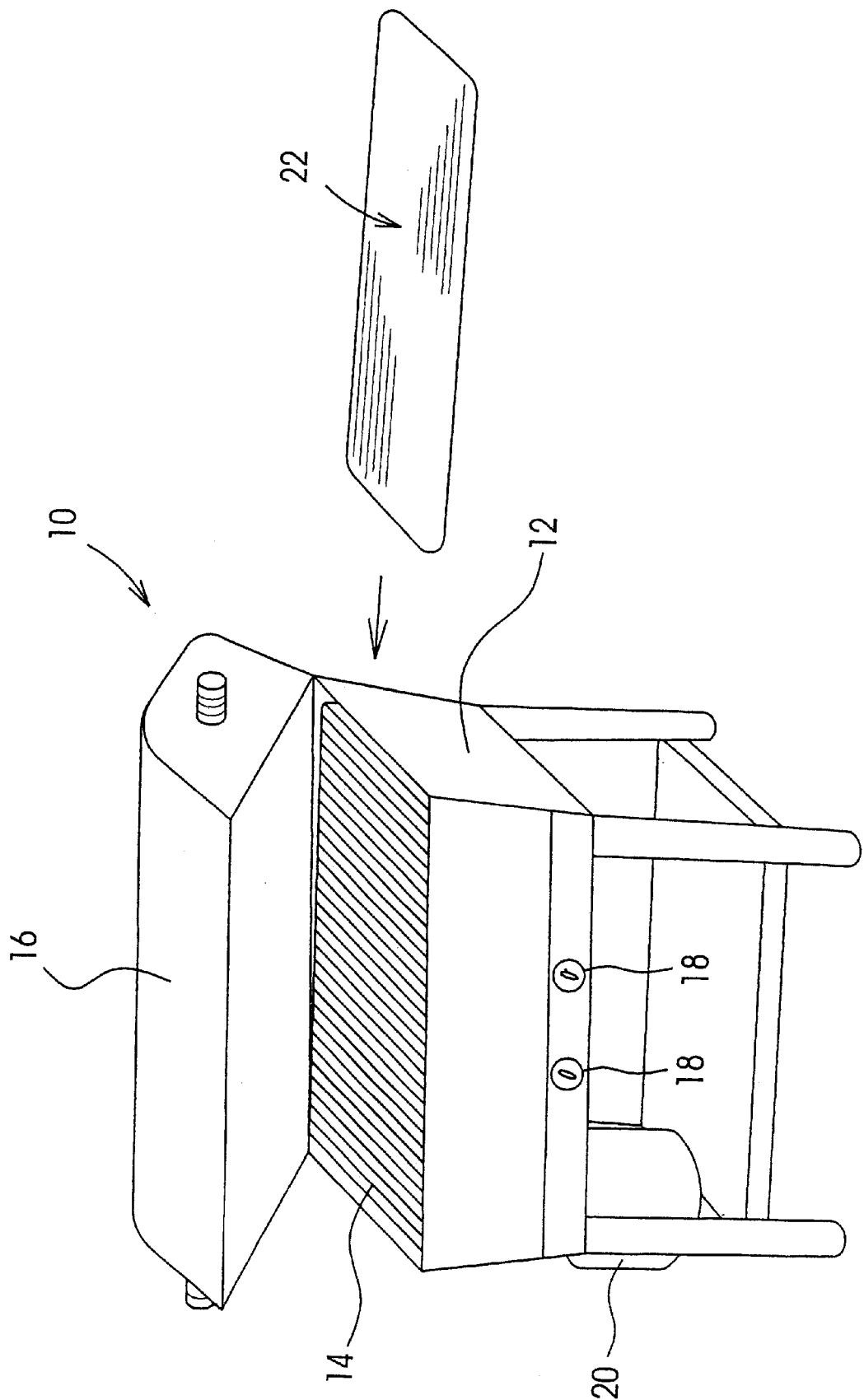
FIG. 1 is a perspective view of a gas-fired barbecue and a heat-resistant, flat sheet in accordance with the invention used for cleaning the gas-fired barbecue.

The invention provides a method and apparatus for cleaning the grill of a barbecue.

FIG. 1 is a perspective view of an exemplary, prior art barbecue 10 that may be cleaned using the method and apparatus in accordance with the invention. The barbecue 10 includes a base 12 which houses a burner (not shown), a grill 14 on which food is cooked and a cover 16 used for covering the food during cooking. The barbecue 10 further includes fuel control valves 18 which control the flow of gaseous fuel (commonly propane) from a fuel cylinder 20, to provide heat for cooking food in a manner well known in the art. The grill 14 of the barbecue 10 is cleaned using a heat-resistant, flat sheet 22 in accordance with the invention, which substantially covers a top surface of the grill 14 and is placed thereon to clean the grill 14, as will be described below in more detail.

FIG. 2 is a perspective view of the heat-resistant, rigid, unperforated flat sheet 22 shown in FIG. 1. The heat-resistant, flat sheet 22 includes a top surface 24 and a reflective bottom surface 26. The heat-resistant, flat sheet 22 is preferably a metal sheet, although other materials may also be used, such as shatter-resistant glasses or ceramics. In accordance with one embodiment of the invention, the heat-resistant sheet is a galvanized steel sheet having a polished side to provide the reflective surface 26. A 26-gauge galvanized steel is preferred, though other gauges may also be used. The heat-resistant, flat sheet 22 may likewise be a stainless steel sheet or an aluminum sheet.

FIG. 3 shows an alternate embodiment of the invention which permits a length of the heat-resistant, flat sheet 22 to be adjusted to accommodate grills of different lengths. A pair of pins 28 having enlarged heads are connected to a top surface 24 of a first sheet 22a. The pins are received in an elongated longitudinal slot 30 in a second sheet 22b. The heads of the pins 28 prevent the first sheet 22a from being separated from the second sheet 22b, while permitting the first and second sheets to be longitudinally reciprocated to adjust the length of the heat-resistant; flat sheet 22.

FIG. 4 is a bottom plan view of another embodiment of the invention. In this embodiment, first and second heat-resistant sheets 22a, 22b are likewise shaped to permit a length of the heat-resistant, flat sheet 22 to be adjusted to accommodate grills of different length. In the embodiment shown in FIG. 4, cut-away portions 31a of the side edges are overlapped by downwardly-turned U-shaped side edges 32 of sheet 22b while the cut-away portions 31b of the side edges are overlapped by upwardly-turned U-shaped side edges 34 of sheet 22a. The U-shaped side edges prevent separation of the sheets 22a, 22b while permitting a length of the heat-resistant, flat sheet 22 to be adjusted to accommodate grills of different length.

FIG. 5 is a perspective view of a circular heat-resistant, flat sheet in accordance with the invention having a top surface 24 and a reflective bottom surface 26.

FIG. 6 shows a further embodiment of the invention, which includes an alert mechanism 36 to remind a user to extinguish the heat source of a barbecue grill 10 after a predetermined time. As will be explained below, it is possible to determine when food residues on a. barbecue grill have been oxidized using the heat-resistant, flat sheet 22 by observing that smoke no longer issues from the grill. Due to entertaining or other activity, however, a user may not notice when smoke has stopped issuing from the grill. In accordance with the invention, the heat-resistant, flat sheet 22 may further include an alert mechanism 36, which is, for example, connected directly to the top surface 24 of the heat-resistant, flat sheet 22. The alert mechanism may be time or heat activated. A selector dial 28 is rotated from a "clean" position to a "start" position before the heat-resistant sheet 22 is placed on the grill of the barbecue. Twisting the selector dial 38 energizes a spring used to generate an audible tone, such as a ringing bell. The audible tone may be initiated by a timer, well known in the art, or by a bi-metallic spring, which initiates the audible tone when the heat-resistant sheet reaches a predetermined temperature, for example, 500° F. As will be understood by those skilled in the art, if the alert mechanism 36 is mounted directly to the heat-resistant, flat sheet 22, it must be constructed of a heat-resistant material, such as stainless steel.

The alert mechanism 36 may also be provided as a stand-alone unit 37 which may be placed in any convenient location that may be heard by the user of the barbecue 10. The stand-alone unit 37 may be manufactured of any desired materials, a thermoplastic, for example. The stand-alone unit 37 also includes a base 40 to provide a secure footing. Otherwise, the stand-alone unit 37 may be substantially identical to the alert mechanism 36 and includes a selector dial 38, which is turned from a "clean" to a "start" position when the heat-resistant, flat sheet 22 is placed on the barbecue grill 14 (FIG. 1) As will be understood by those skilled in the art, the stand-alone alert mechanism 37 is time activated and turning the selector dial 38 winds a spring, which drives a timer mechanism as well as the audible tone generator. The time mechanism is preferably timed to activate the audible tone mechanism after an elapsed period of about 10 minutes.

The heat-resistant, flat sheet 22 is placed on the grill 14 (FIG. 1) after cooking is completed. The cooking temperature is preferably not changed when the heat-resistant sheet 22 is placed on the grill 14. After the heat-resistant, flat sheet 22 is placed on the grill 14, if the barbecue has a cover, the cover 16 of the barbecue 10 is closed. The barbecue 10 is then operated for a period of time required to oxidize food residues on the grill 14. The time required for oxidation may be determined by observing the smoke that issues from the barbecue 10. When oxidation is complete, smoke no longer issues from the barbecue 10. After oxidation is complete, the barbecue 10 is turned off by extinguishing the heat source. If an alert mechanism 36, 37 is used to remind the user when the cleaning process is completed, the selector dial 38 is rotated by the user from the "clean" to the "start" position immediately before or after the heat-resistant, flat sheet 22 is placed on the barbecue grill 14. When the audible tone sounds, the heat source is extinguished and the barbecue is preferably permitted to cool prior to removal of ash, as described above.

The invention therefore provides a novel, simple. apparatus and method of cleaning a barbecue grill which is more effective and considerably-more energy-efficient than known prior art methods.

The embodiment(s) of the invention described above is(are) intended to be exemplary only. The scope of the invention is therefore intended to be limited solely by the scope of the appended claims.

We claim:

1. Apparatus for cleaning a barbecue grill, comprising a heat-resistant, rigid, unperforated flat sheet with a reflective surface, the flat sheet being dimensioned to substantially cover the barbecue grill, while permitting a cover for the barbecue to be closed, whereby the flat sheet is placed with the reflective surface oriented toward the grill to promote oxidation of food residue on the grill by trapping and reflecting heat.

2. Apparatus as claimed in claim 1 wherein the flat sheet comprises a galvanized steel sheet with at least one polished side.

3. Apparatus as claimed in claim 2 wherein the flat sheet comprises a 24-gauge galvanized steel sheet.

4. Apparatus as claimed in claim 1 wherein the flat sheet comprises a stainless steel sheet with at least one polished side.

5. Apparatus as claimed in claim 4 wherein the flat sheet comprises a 24-gauge stainless steel sheet.

6. Apparatus as claimed in claim 1 wherein the flat sheet comprises an aluminum sheet with at least one polished side.

7. Apparatus as claimed in claim 6 wherein the flat sheet comprises a 24-gauge aluminum sheet.

8. Apparatus as claimed in claim 1 wherein the flat sheet is adjustable in length to permit the sheet to be used for grills of different lengths within a predetermined range.

9. Apparatus as claimed in claim 8 wherein the flat sheet comprises:
   a first sheet with a reflective side and at least one elongated longitudinal slot;
   a second sheet with a reflective side, the second sheet including, projecting outwardly from a side opposite the reflective side, at least two pins located to be received in respective ones of the at least one elongated longitudinal slot in the first sheet, the pins having heads that permit the first and second sheets to be reciprocally removed with respect to each other but inhibit the first and second sheet from being separated.

10. Apparatus as claimed in claim 8 wherein the flat sheet comprises:
    a first sheet with a reflective side;
    a second sheet with a reflective side,
    the first and second sheets including U-shaped side edges that wrap around respective side edges and a surface of the other sheet to permit the first and second sheets to be reciprocally moved with respect to each other within a predetermined range.

11. Apparatus as claimed in claim 10 further including an alert mechanism to remind a user that the barbecue should be extinguished, the alert mechanism having a selector dial that is turned from a "clean" position to a "start" position when the heat-resistant, rigid, unperforated flat sheet is placed on the barbecue grill.

12. Apparatus as claimed in claim 11 wherein the alert mechanism is mounted to a top surface of the flat plate.

13. Apparatus as claimed in claim 12 wherein the alert mechanism is heat activated, and the alert is triggered when the flat plate reaches a predetermined temperature.

14. Apparatus as claimed in claim 11 wherein the alert mechanism is time activated.

15. Apparatus as claimed in claim 11 wherein the alert mechanism comprises a bell that emits an audible signal.

16. A method of cleaning a barbecue grill after cooking food on the grill, comprising steps of:
    without extinguishing the heat source, placing a heat-resistant, rigid, unperforated flat sheet with a reflective surface on the grill after cooked food has been removed, with the reflective surface oriented toward the heat source, the flat sheet being dimensioned to substantially cover the barbecue grill;
    if the grill has a cover, closing the cover of the barbecue grill; and
    extinguishing the heat source after smoke stops issuing from the barbecue, unless the heat source is a self-extinguishing carbonaceous fuel.

17. The method as claimed in claim 16 further comprising steps of:
    permitting the barbecue to cool to ambient temperature before removing the flat sheet; and
    brushing ash from the barbecue grill after the flat sheet is removed.

18. The method as claimed in claim 16 further comprising a steps of:
    leaving the flat sheet on the barbecue grill until a next time the barbecue grill is to be used;
    removing the flat sheet from the grill; and
    brushing ash from the grill prior to igniting the barbecue.

19. A method of cleaning a cold barbecue grill, comprising steps of:
    igniting the heat source for the barbecue;
    placing a heat-resistant, rigid, unperforated flat sheet with a reflective surface on the grill with the reflective surface oriented toward the heat source for the barbecue, the flat sheet being dimensioned to substantially cover the barbecue grill;
    if the grill has a cover, closing the cover of the barbecue grill; and
    extinguishing the heat source after smoke stops issuing from the barbecue, unless the heat source is a self-extinguishing carbonaceous fuel.

20. The method as claimed in claim 19 further comprising steps of:
    permitting the barbecue to cool to ambient temperature before removing the flat sheet; and
    brushing ash from the barbecue grill after the flat sheet is removed.

* * * * *